(12) United States Patent
Cui

(10) Patent No.: US 11,287,269 B2
(45) Date of Patent: Mar. 29, 2022

(54) MAP COORDINATE DISTORTION COMPENSATION

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 194 days.

(21) Appl. No.: 16/709,239

(22) Filed: Dec. 10, 2019

(65) Prior Publication Data

US 2021/0172745 A1 Jun. 10, 2021

(51) Int. Cl.
*G01C 21/32* (2006.01)

(52) U.S. Cl.
CPC ................... *G01C 21/32* (2013.01)

(58) Field of Classification Search
CPC ................. G01C 21/32; G01C 21/30
See application file for complete search history.

(56) References Cited

U.S. PATENT DOCUMENTS

| | | | |
|---|---|---|---|
| 5,544,052 A * | 8/1996 | Fujita | G06T 3/0062 702/5 |
| 6,014,610 A | 1/2000 | Judge et al. | |
| 6,748,320 B2 | 6/2004 | Jones | |
| 8,107,971 B1 | 1/2012 | Roberts | |
| 10,089,554 B1 * | 10/2018 | Chartrand | G06K 9/72 |
| 10,445,895 B2 | 10/2019 | Knorr et al. | |
| 2010/0091017 A1 * | 4/2010 | Kmiecik | G06T 3/4038 345/420 |
| 2010/0266161 A1 * | 10/2010 | Kmiecik | G01C 21/3822 382/103 |
| 2011/0170799 A1 * | 7/2011 | Carrino | G09B 29/007 382/285 |
| 2014/0104424 A1 | 4/2014 | Zhang et al. | |
| 2018/0189578 A1 * | 7/2018 | Yang | G06K 9/00798 |
| 2019/0068884 A1 * | 2/2019 | Purkait | G05D 1/0088 |

FOREIGN PATENT DOCUMENTS

| | | |
|---|---|---|
| EP | 2343659 A1 | 7/2011 |
| JP | 2011027574 A * | 2/2011 |

OTHER PUBLICATIONS

English Translation of JP2011027574A.*
International Search Report and Written Opinion for PCT/2020/064096 dated Mar. 16, 2021, 7 pages.

* cited by examiner

*Primary Examiner* — Rami Khatib
(74) *Attorney, Agent, or Firm* — Sheppard Mullin Richter & Hampton LLP

(57) ABSTRACT

Provided herein is a system comprising: one or more processors; and a memory storing instructions that, when executed by the one or more processors, causes the system to perform: generating a projection of a map having an origin; determining distortion factors of the map relative to distances from the origin; determining a distance from a vehicle to the origin; determining a reading from a sensor of the vehicle; and adjusting the reading to coordinates of the map based on a distortion factor corresponding to the distance.

20 Claims, 13 Drawing Sheets

MAP COORDINATE DISTORTION COMPENSATION

TECHNICAL FIELD

The present disclosure relates generally to map coordinate systems and navigational systems that utilize the map coordinate systems, particularly for vehicle such as autonomous vehicles.

BACKGROUND

Currently, generating a 2-D map from a 3-D globe inevitably results in distortions, meaning that relative distances on the 2-D map may not be accurate. One method of generating a 2-D map includes using a Universal Transverse Mercator (UTM) coordinate system. Because certain sensor data generated by odometry data such as velocity and acceleration may be translated into coordinates of the 2-D map, inaccuracies in the 2-D map may result in inaccuracies in the translated sensor data. For example, if sensor data indicates an object is 100 miles away, but the 2-D map has a 1 percent distortion error at that distance, the translated sensor data onto the 2-D map may indicate that the object is actually 101 miles away when the object appears to be 100 miles away on the map. Some methods that attempt to rectify these inaccuracies are time-consuming. These shortfalls are addressed by the present disclosures, which provide an efficient and effective system to compensate for distortions on a 2-D map and accurately display sensor data.

SUMMARY

Various embodiments of the present disclosure provide a system comprising: one or more processors; and a memory storing instructions that, when executed by the one or more processors, causes the system to perform: generating a projection of a map having an origin; determining distortion factors of the map relative to distances from the origin; determining a distance from a vehicle to the origin; determining a reading from a sensor of the vehicle; and adjusting the reading to coordinates of the map based on a distortion factor corresponding to the distance.

In some embodiments, the reading comprises a velocity or an acceleration.

In some embodiments, the adjusting the reading to the coordinates of the map based on the distortion factor comprises multiplying the reading by the distortion factor corresponding to the distance.

In some embodiments, the instructions further cause the system to perform: navigating the vehicle based on the adjusted reading.

In some embodiments, the instructions further cause the system to perform: adjusting a range over which the sensor operates based on the distortion factor corresponding to the distance.

In some embodiments, the distortion factors of the map increase as the distances from the origin increase.

In some embodiments, the generating the projection of the map having the origin comprises generating the map based on a Universal Transverse Mercator (UTM) coordinate system in a latitude direction and based on a World Geodetic System (WGS84) coordinate system in a longitude direction.

In some embodiments, the determining the distortion factors of the map relative to distances from the origin comprises determining the distortion factors based on respective amounts of distortion of a Universal Transverse Mercator (UTM) coordinate system at corresponding distances from the origin.

In some embodiments, the distortion factors indicate respective amounts of distortion of a Universal Transverse Mercator (UTM) coordinate system at corresponding distances from the origin.

In some embodiments, the sensor comprises any of an inertial measurement unit (IMU), a wheel encoder, a LiDar sensor, and a radar sensor.

Various embodiments of the present disclosure provide a method implemented by a computing system including one or more processors and storage media storing machine-readable instructions, wherein the method is performed using the one or more processors, the method comprising: generating a projection of a map having an origin; determining distortion factors of the map relative to distances from the origin; determining a distance from a vehicle to the origin; determining a reading from a sensor of the vehicle; and adjusting the reading to coordinates of the map based on a distortion factor corresponding to the distance.

In some embodiments, the reading comprises a velocity or an acceleration.

In some embodiments, the adjusting the reading to the coordinates of the map based on the distortion factor comprises multiplying the reading by the distortion factor corresponding to the distance.

In some embodiments, the method further comprises: navigating the vehicle based on the adjusted reading.

In some embodiments, the method further comprises: adjusting a range over which the sensor operates based on the distortion factor corresponding to the distance.

In some embodiments, the distortion factors of the map increase as the distances from the origin increase.

In some embodiments, the generating the projection of the map having the origin comprises generating the map based on a Universal Transverse Mercator (UTM) coordinate system in a latitude direction and based on a World Geodetic System (WGS84) coordinate system in a longitude direction.

In some embodiments, the determining the distortion factors of the map relative to distances from the origin comprises determining the distortion factors based on respective amounts of distortion of a Universal Transverse Mercator (UTM) coordinate system at corresponding distances from the origin.

In some embodiments, the distortion factors indicate respective amounts of distortion of a Universal Transverse Mercator (UTM) coordinate system at corresponding distances from the origin.

In some embodiments, the sensor comprises any of an inertial measurement unit (IMU), a wheel encoder, a LiDar sensor, and a radar sensor.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
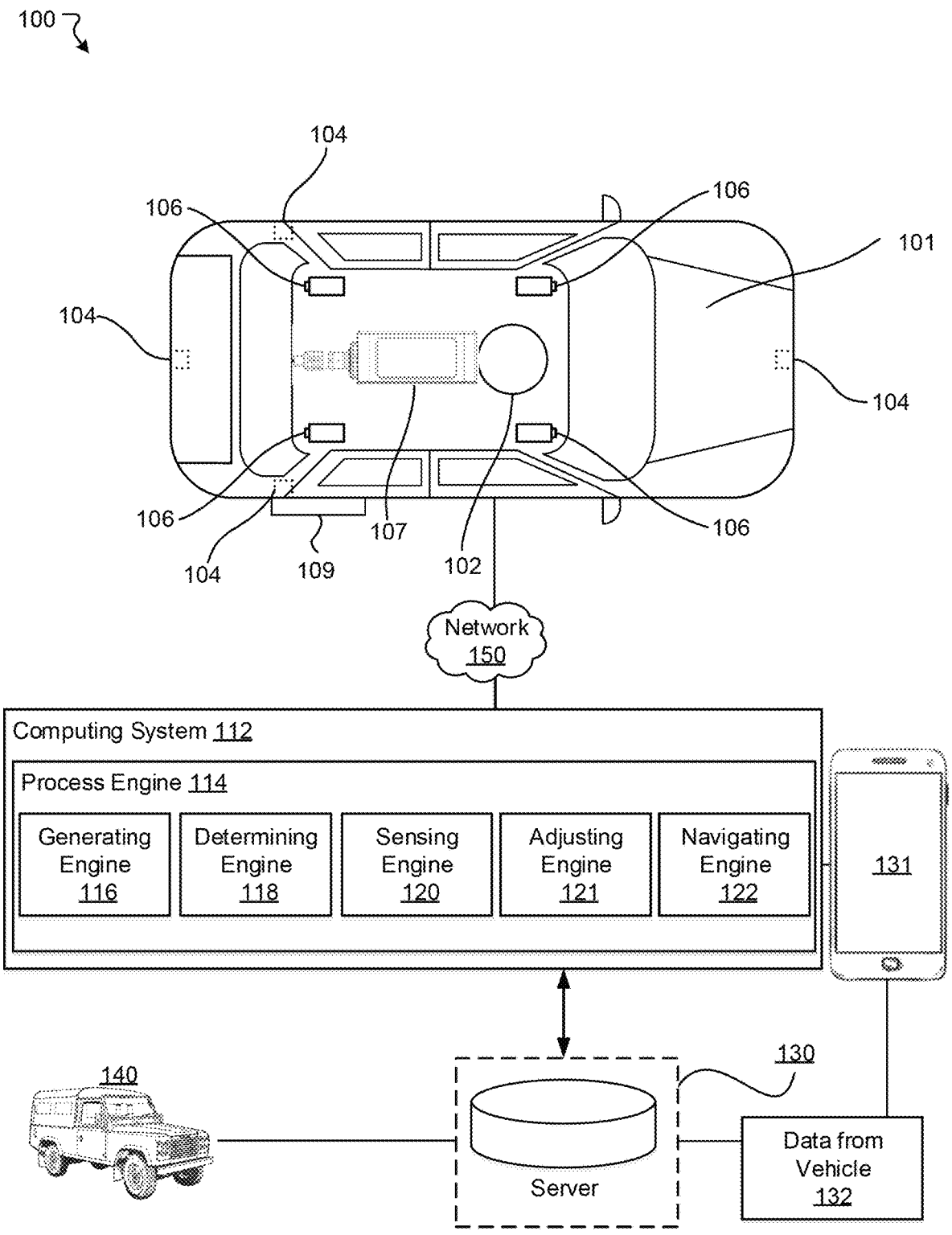
FIG. 1 illustrates an example environment of a system according to one or more embodiments of the present disclosure.

FIG. 1 illustrates an example environment 100 of a system that generates a projection of a map having an origin, determines distortion factors of the map relative to distances from the origin, determines a distance from a vehicle to the origin, determines a reading from a sensor of the vehicle, estimates a position of the vehicle based on the reading and the map, and adjusts the estimated position based on a distortion factor corresponding to the distance. In FIG. 1, a vehicle such as an autonomous vehicle 101 may include myriad sensors (LiDAR systems 102, radar systems 104, cameras 106, GPS, sonar, ultrasonic, one or more IMUs (inertial measurement units) 107, accelerometers, gyroscopes, magnetometers, and FIR (far infrared) sensors) to detect and identify objects in the surrounding. Additionally, the vehicle 101 may include a wheel encoder 109. For example, the LiDAR systems 102 can generate a three-dimensional map of the environment. The LiDAR systems 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input, and based on data from the myriad sensors. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

In various embodiments, at least one computing system 112 that includes one or more processors and memory, may be connected, over a network 150, to a device 131. The at least one computing system 112 may be physically and/or electrically connected to a vehicle 101. In some embodiments, the at least one computing system 112 may be integrated as part of the vehicle 101. One or more users may, through the device 131, request, view, and/or access details of the sensors 102, 104, 106, 107, and 109, and of the vehicle 101.

The processors may be configured to perform various operations by interpreting machine-readable instructions. In some embodiments, the example environment 100 may be implemented as a data platform. In some embodiments, the example environment 100 may be configured to interact with the at least one computing system 112 of the data platform. In various embodiments, the at least one computing system 112 of the data platform may coordinate and/or control one or more operations of generating a projection of a map having an origin; determining distortion factors of the map relative to distances from the origin; determining a distance from a vehicle to the origin; determining a reading from a sensor of the vehicle; estimating a position of the vehicle based on the reading and the map; and adjusting the estimated position based on a distortion factor corresponding to the distance.

In some embodiments, the at least one computing system 112 may include a process engine 114. The process engine 114 may include a generating engine 116, a determining engine 118, a sensing engine 120, an adjusting engine 121, and a navigating engine 122. The process engine 114 may be executed by the processor(s) of the computing system 112 to perform various operations including those operations described in reference to the generating engine 116, the determining engine 118, the sensing engine 120, the adjusting engine 121, and the navigating engine 122. In general, the process engine 114 may be implemented, in whole or in part, as software that is capable of running on one or more computing devices or systems. In one example, the process engine 114 may be implemented as or within a software application running on one or more computing devices (e.g., user or client devices) and/or one or more servers (e.g., network servers or cloud servers, servers 130). In some instances, various aspects of the generating engine 116, the determining engine 118, the sensing engine 120, the adjusting engine 121, and the navigating engine 122 may be implemented in one or more computing systems and/or devices. In some instances, one or more of the generating engine 116, the determining engine 118, the sensing engine 120, the adjusting engine 121, and the navigating engine 122 may be combined or integrated into a single processor, and some or all functions performed by one or more of the generating engine 116, the determining engine 118, the sensing engine 120, the adjusting engine 121, and the navigating engine 122 may not be spatially separated, but instead may be performed by a common processor. The environment 100 may also include the one or more servers 130 accessible to the computing system 112. The one or more servers 130 may store and update information generated or output from any of the generating engine 116, the determining engine 118, the sensing engine 120, the adjusting engine 121, and the navigating engine 122. For example, the one or more servers 130 may store data indicating distortion factors at corresponding distances from the origin of the map.

The one or more servers 130 may be accessible to the computing system 112 either directly or over the network 150. In some embodiments, the one or more servers 130 may store data that may be accessed by the process engine 114 to provide the various features described herein. In some instances, the one or more servers 130 may include federated data stores, databases, or any other type of data source from which data may be stored and retrieved, for example. In some implementations, the one or more servers 130 may include various types of data sets on which determinations of accuracy or consistency with other information can be made. In general, a user operating a computing device can interact with the computing system 112 over the network 150, for example, through one or more graphical user interfaces and/or application programming interfaces. The one or more servers 130 may store data 132 from the vehicle 101 and exchange the data 132 with another vehicle 140. The one or more servers 130 may store data from the another vehicle 140 and exchange the data from the another vehicle 140 with the vehicle 101. The one or more servers 130 may exchange data from the one or more servers 130 with the vehicle 101 or the another vehicle 140.

The generating engine 116 may be configured to generate a 2-dimensional (2D) projection of a map from a 3-dimensional (3D) globe. In some embodiments, the generating engine 116 may be configured to generate the 2D projection of the map having an origin. The origin may be at a predetermined location. In some embodiments, the 2D projection of the map may be generated based on a Universal Transverse Mercator (UTM) coordinate system. In some embodiments, the 2D projection of the map may be generated based on a Universal Transverse Mercator (UTM) coordinate system in a latitude direction and based on a World Geodetic System (WGS84) coordinate system in a longitude direction. The determining engine 118 may be configured to determine distortion factors of the generated 2D map relative to distances from the origin. In some embodiments, the determining engine 118 may be configured to determine a distortion factor of the generated 2D map at each distance from the origin. The distortion factors may indicate an amount by which to multiply relative distances of map coordinates obtain actual relative distances that match sensor readings. For example, if a distortion factor at a specific distance, such as 100 km, from the origin is 1.01, and a sensor reading indicates a relative distance between two locations is 100 km, a distance in map coordinates that corresponds to the 100 km relative distance in the sensor reading would be 101 km. In some embodiments, the distortion factors at a location may be based primarily or solely on the distance of the location from the origin. In some embodiments the distortion factors may be obtained based on, or equal to, respective amounts of distortion of a Universal Transverse Mercator (UTM) coordinate system at corresponding distances from the origin.

The sensing engine 120 may comprise the sensors 102, 104, 106, 107, and 109 that acquire sensor readings. The sensor readings may include velocity, acceleration, and distance information. The adjusting engine 121 may be configured to adjust the sensor readings from the sensing engine 120 to coordinates of the map based on the distortion factor corresponding to the distance. The adjusting engine 121 may multiply the sensor readings by the distortion factor corresponding to the distance to adjust the sensor readings to the coordinates of the map. For example, if a distortion factor at a specific distance, such as 100 km, from the origin is 1.01, and a sensor reading indicates a relative distance between two locations is 50 km, a distance in map coordinates that corresponds to or matches the 100 km relative distance in the sensor reading would be 50 km*1.01 or 50.5 km. The adjusting engine 121 may adjust relative distances between two locations, such as relative distances between two objects or entities, to match the adjusted reading in map coordinates. For example, the adjusting engine 121 may adjust relative distances between two locations, such as between the vehicle 101 and an object or entity, to be 50.5 km apart rather than 50 km apart. The adjusting engine 121 may verify the adjusted readings in map coordinates using other sensors or verified satellite map data from sensors such as GNSS sensors including RTK, PSR, SP, and dual antenna heading. In some embodiments, the adjusting engine 121 may be configured to adjust the sensor readings into map coordinates in response to an accumulated error exceeding a threshold error. In response to a sensor reading being a velocity, the adjusting engine 121 may determine the accumulated error by determining a product of the velocity, a time interval between two sensor inputs, and the distortion factor minus one. In response to a sensor reading being an acceleration, the adjusting engine 121 may determine the accumulated error by determining a product of the acceleration, a square of a time interval between two sensor inputs, and the distortion factor minus one. The adjusting engine 121 may be configured to determine a distortion over a range of a sensor by determining a product of the range and the distortion factor minus one, and adjust sensor readings over the range by the distortion factor, in response to the determined distortion over the range of the sensor exceeding a threshold error. For example, if a cutoff range for a LiDar sensor is 120 m, assuming a distance of 141 km from the origin of the map at which the distortion factor is 1.00012, the distortion error would be 0.00012*120 m or 1.44 cm. At a distance of 707 km, at which the distortion factor is 1.0031, the distortion error would be 0.031*120 m or 37.2 cm.

The navigating engine 122 may determine, adjust, or modify one or more vehicle navigating actions based on the adjusted sensor reading in the map coordinates, and/or the adjusted relative distances between two locations or entities. For example, the navigating engine 122 may determine to take an alternative route or a detour to avoid a construction site, or a yielding action to yield to a pedestrian or another vehicle.

Figure 2:
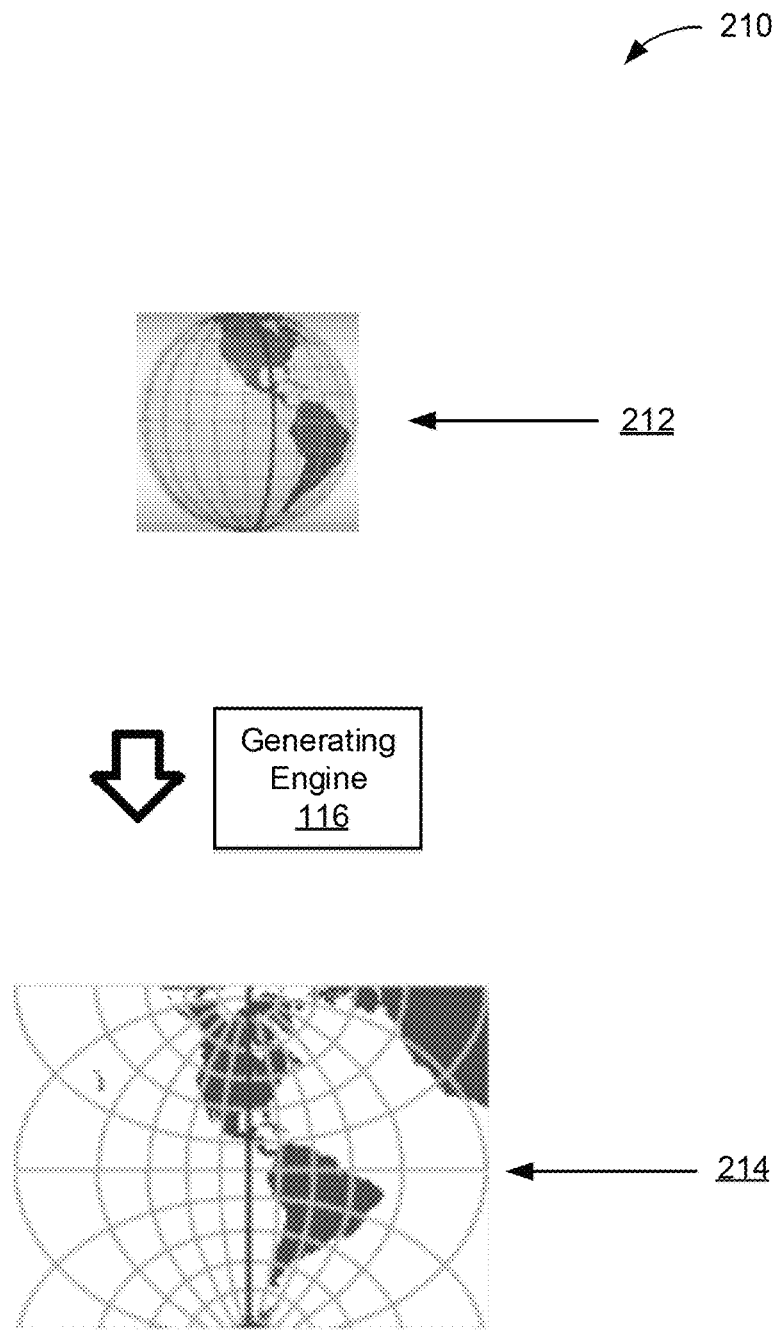
FIGS. 2-5 illustrate example implementations of a computing system according to embodiments of the present disclosure.

FIG. 2 illustrates an example implementation of a computing system of the present disclosure. In FIG. 2, a generating engine such as the generating engine 116 may, from a 3D globe 212, generate a 2D projection of a map 214. The generating engine 116 may generate the 2D projection of the map 214 using a Universal Transverse Mercator (UTM) coordinate system, or a Universal Transverse Mercator (UTM) coordinate system in a latitude direction and a World Geodetic System (WGS84) coordinate system in a longitude direction.

Figure 3:

FIG. 3 illustrates an example implementation of a computing system of the present disclosure. In FIG. 3, a determining engine such as the determining engine 118 may determine distortion factors 314 of the generated 2D map, such as the map 214, at different distances 312 from the origin. The determining engine 118 may generate a table 310 such as a lookup table that indicates the distortion factors at each of the different distances from the origin. The determining engine 118 may store the table 310 in the one or more servers 130. The distortion factors may increase as the distances from the origin increase.

Figure 4A:
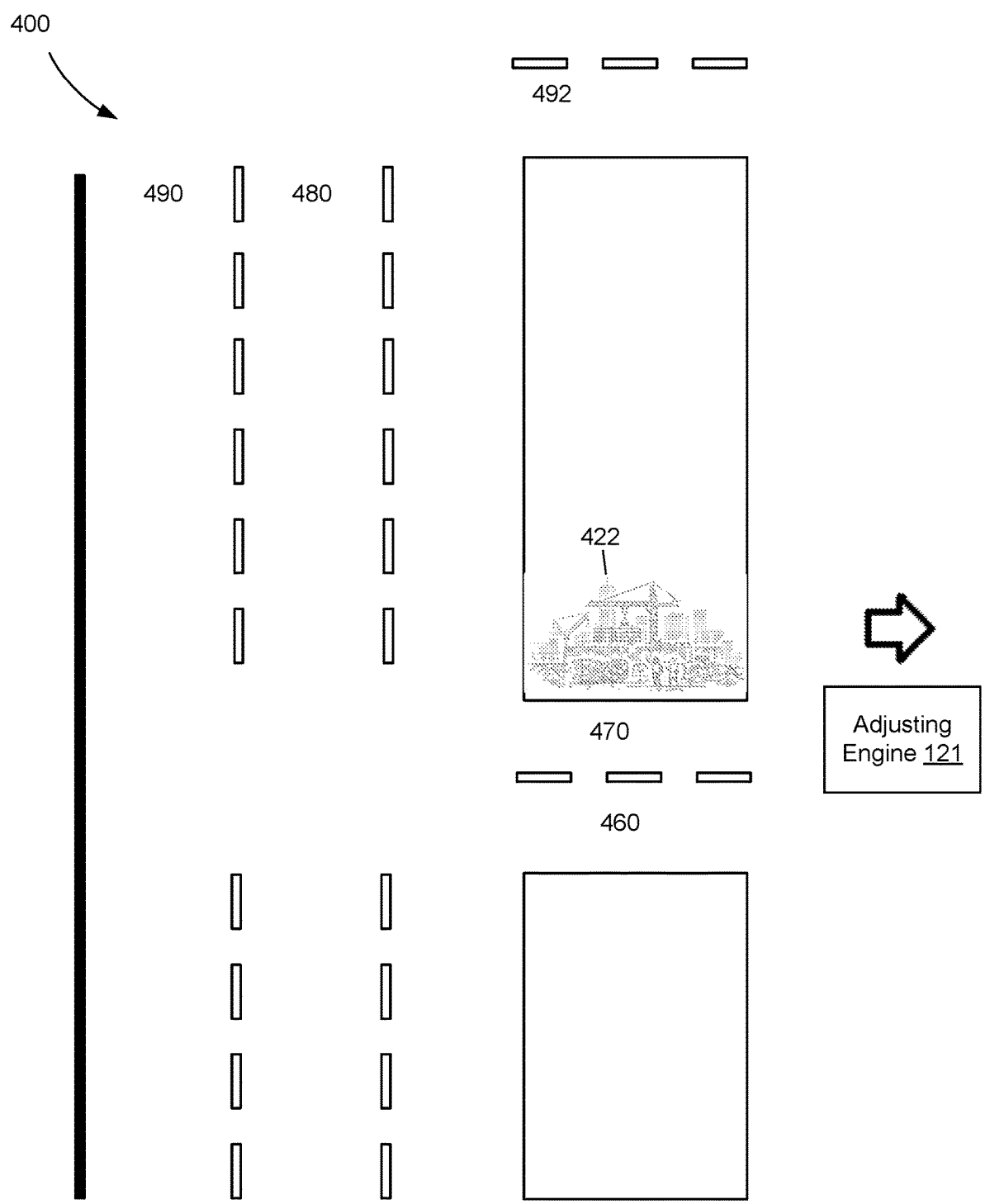
Figure 4A:
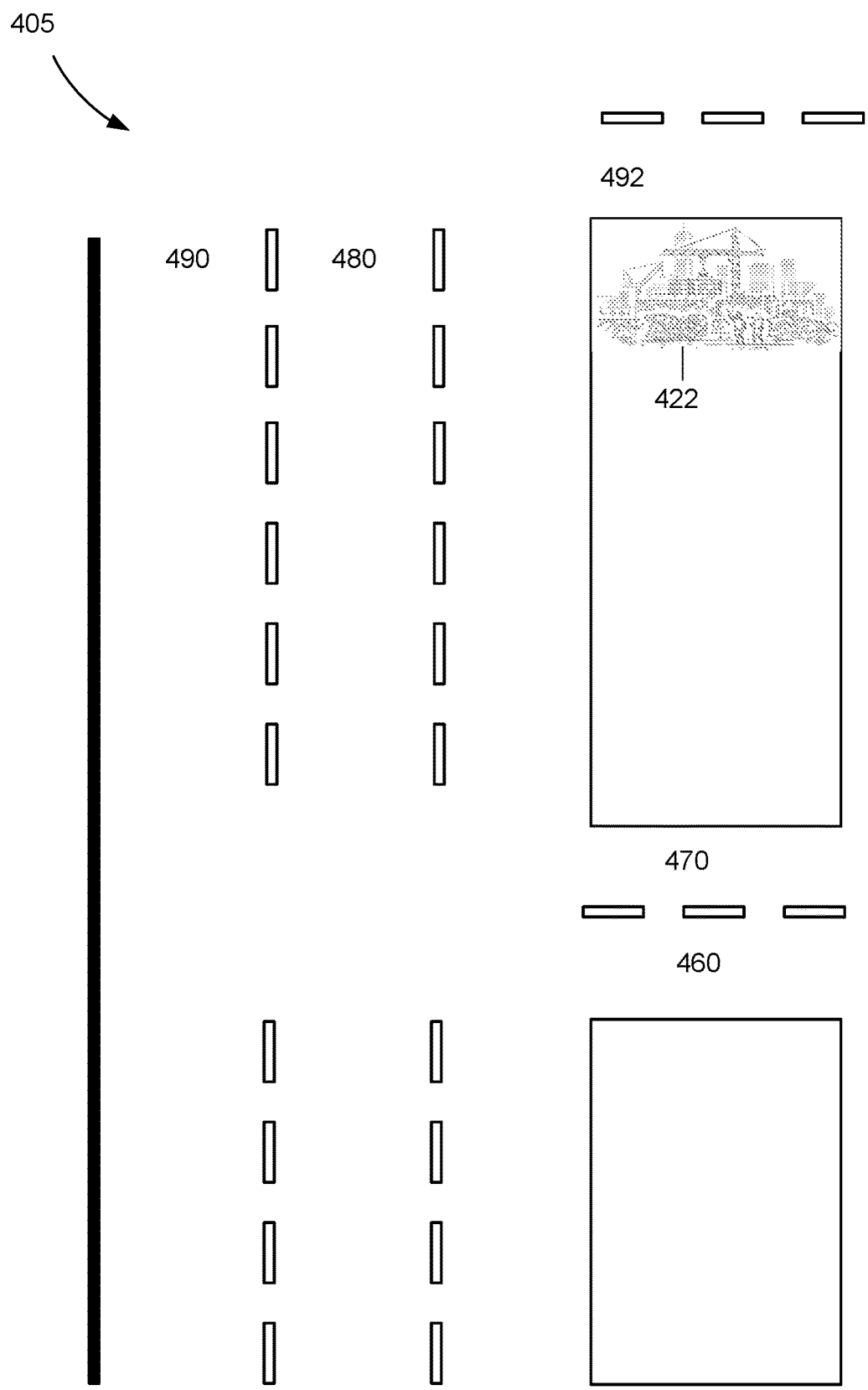

FIG. 4A illustrates an example implementation of a computing system, specifically, of an adjusting engine such as the adjusting engine 121, of the present disclosure. In the implementation 400 of FIG. 4A, the sensing engine 120 may initially acquire data indicating that a road located a certain distance away, such as 100 km, from the origin of the map 214 a road including lanes 460, 470, 480, 490, and 492, and a construction site 422, and project the data onto a map such as the map 214. The relative positions of the lanes 460, 470, 480, 490, and 492, from the origin, may already be verified, whereas a relative position of the construction site 422 from the origin may not be verified. The implementation 400 shows a position of the construction site 422 without accounting for distortions of the map 214, as next to the lane 470. The adjusting engine 121 may adjust the position of the construction site 422 in implementation 405 to account for the distortion factor at 100 km away from the origin of the map, to its correct location. The construction site 422 may now be determined to be next to the lane 492.

Figure 4B:
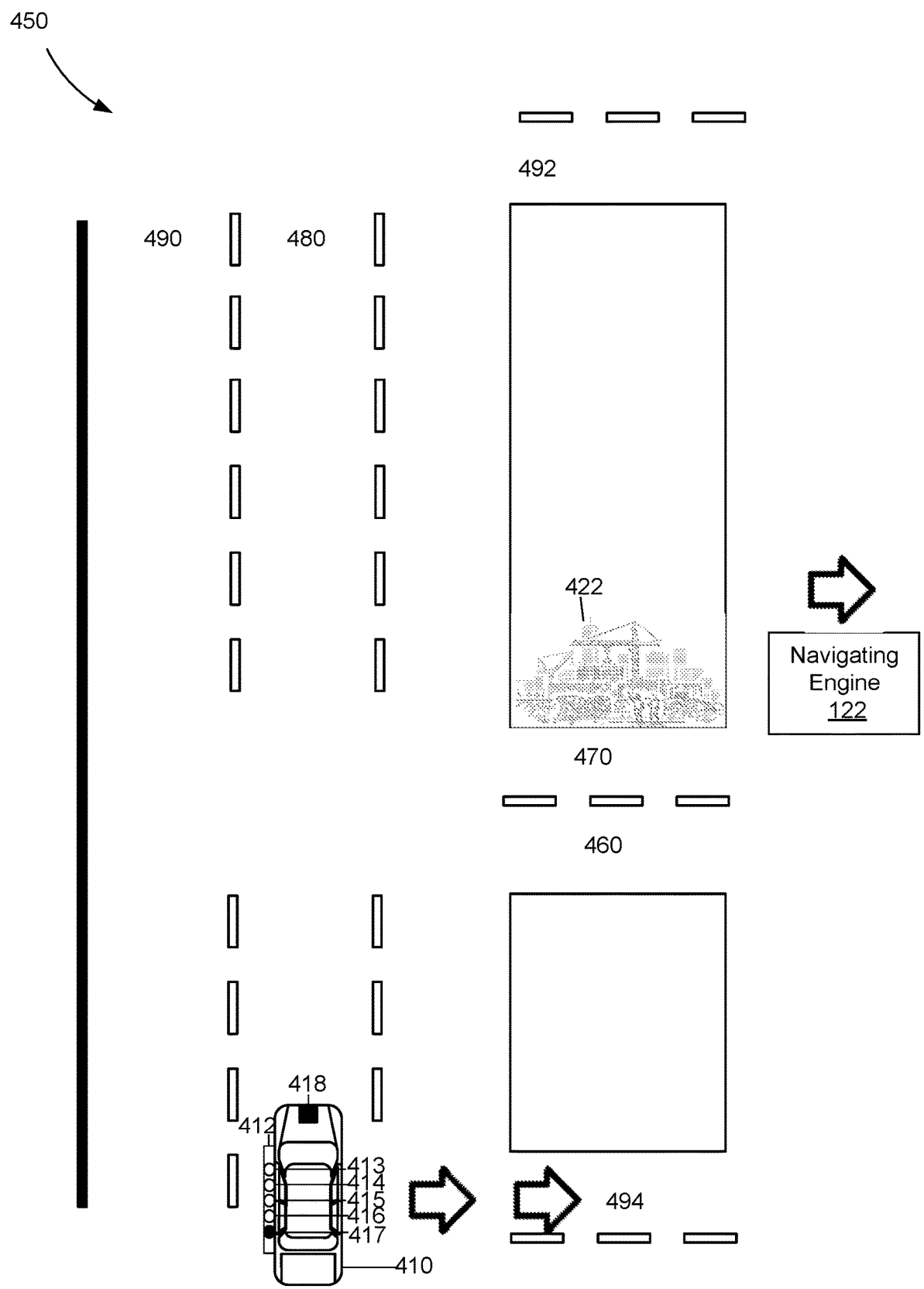
Figure 4B:
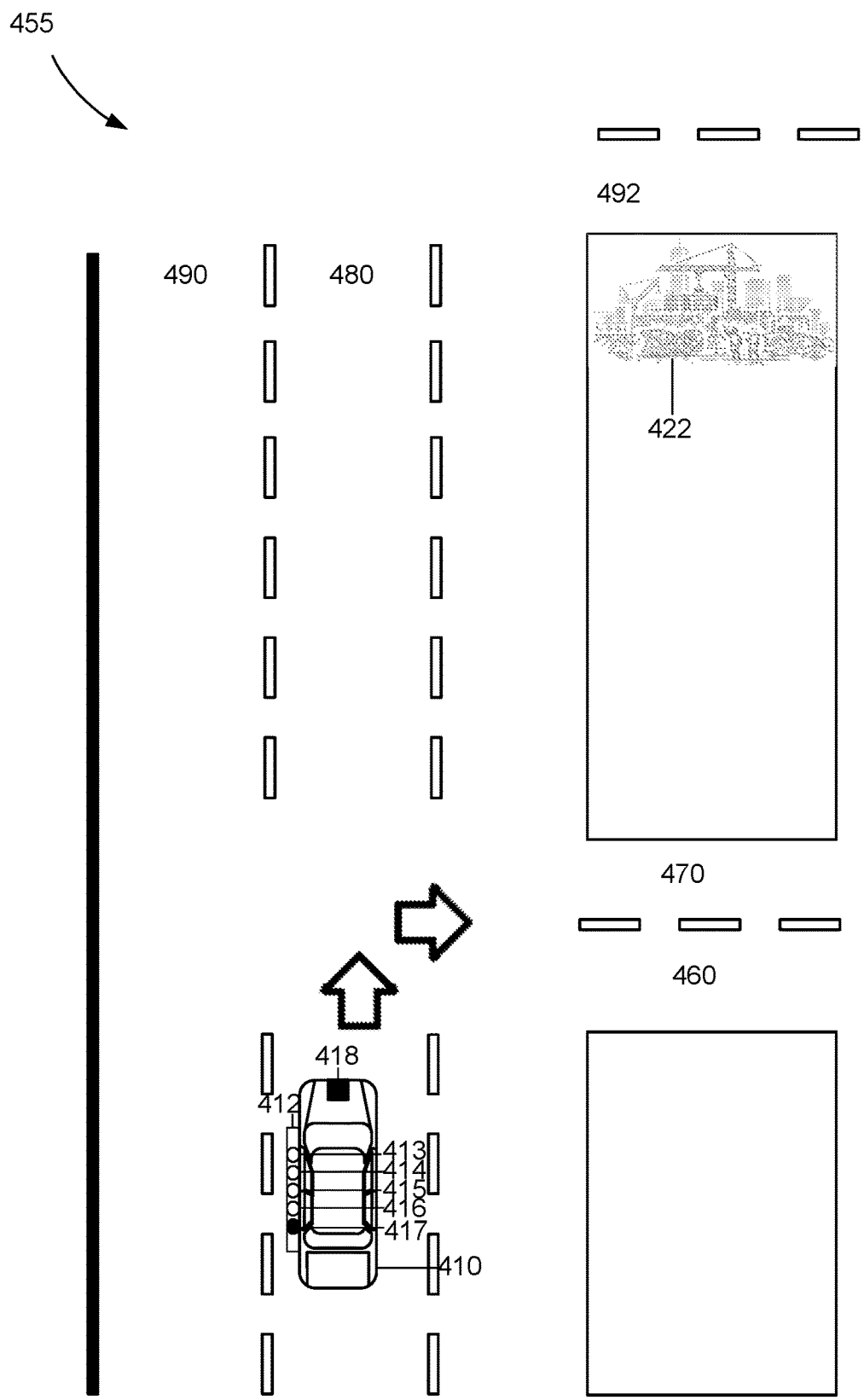

FIG. 4B illustrates an example implementation of a computing system, specifically, of a navigating engine such as the navigating engine 122, of the present disclosure. In the implementation 450 of FIG. 4B, the navigating engine 122 hypothetically would have, based on the implementation 400 that indicates the position of the construction site 422 without accounting for distortions of the map 214, determined one or more navigation actions of the vehicle 410, in the event that the construction site 422 is determined to be at such position. The vehicle 410, which may be implemented as the vehicle 101, may comprise an active Doppler sensor 418 and/or other sensors used to obtain data of an environment of the vehicle 410. The vehicle 410 may comprise an array 412 of lights, which may include lights 413, 414, 415, 416, and 417. In some embodiments, the array 412 may comprise any number of lights. Five lights are shown merely for illustrative purposes. For example, the vehicle 410, via the navigating engine 122, would have determined a detour into lane 494 in order to avoid the construction site 422.

In implementation 455, the navigating engine 122 may determine one or more navigation actions of the vehicle 410 based on the adjusted position of the construction site 422, in order to avoid the construction site 422 or utilize a detour resulting from the construction site 422. In some embodiments, the navigating engine 122 may determine that the vehicle 410 is to proceed along the lane 480 and turn into the lane 470. In some embodiments, the navigating engine 122 may not determine a navigation action in the implementation 450 and instead determine a navigation action in the implementation 455, because the implementation 450 does not show an accurate or adjusted position of the obstacle 422.

Figure 5A:
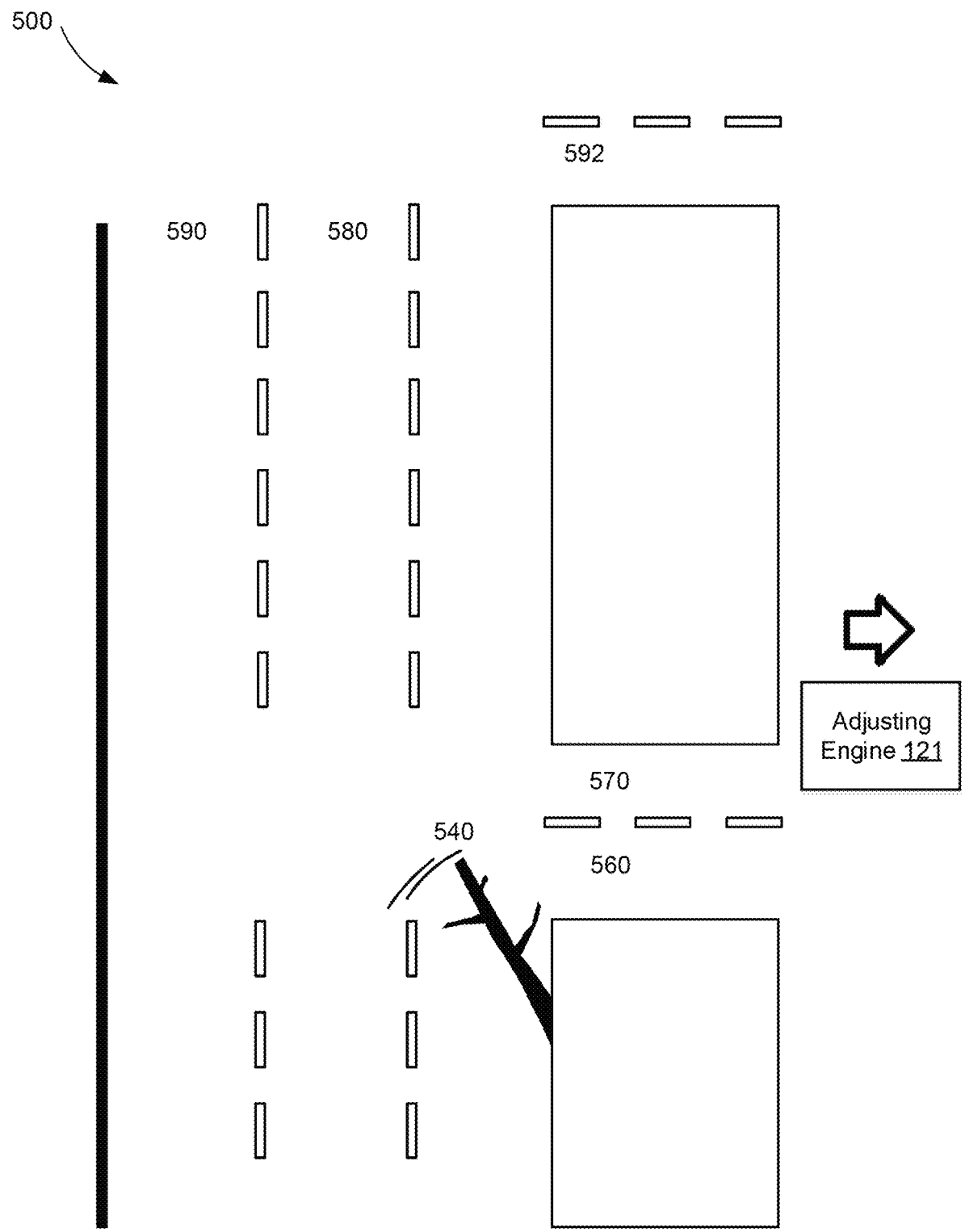
Figure 5A:
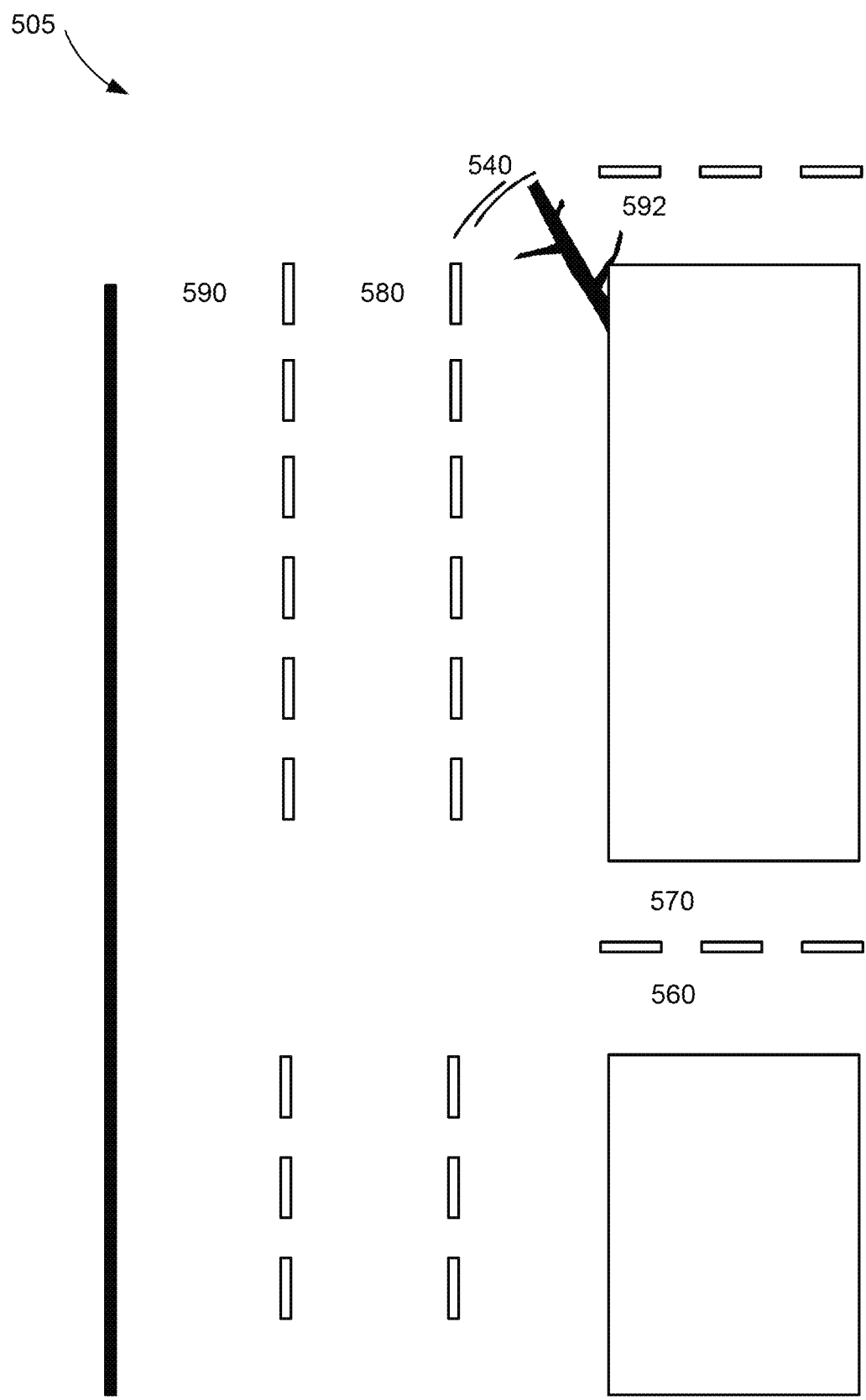

FIG. 5A illustrates an example implementation of a computing system, specifically, of an adjusting engine such as the adjusting engine 121, of the present disclosure. In the implementation 500 of FIG. 5A, the sensing engine 120 may initially acquire data indicating that a road located a certain distance away, such as 100 km, from the origin of the map 214 a road including lanes 560, 570, 580, 590, and 592, and an obstacle 540, and project the data onto a map such as the map 214. The relative positions of the lanes 560, 570, 580, 590, and 592, from the origin, may already be verified, whereas a relative position of the obstacle 540 from the origin may not be verified. The implementation 500 shows a position of the obstacle 540 without accounting for distortions of the map 214, as next to the lane 560. The adjusting engine 121 may adjust the position of the obstacle 540 in implementation 505 to account for the distortion factor at 100 km away from the origin of the map, to its correct location. The obstacle 540 may now be determined to be next to the lane 592. In some embodiments, the obstacle 540 may be a fallen tree.

Figure 5B:
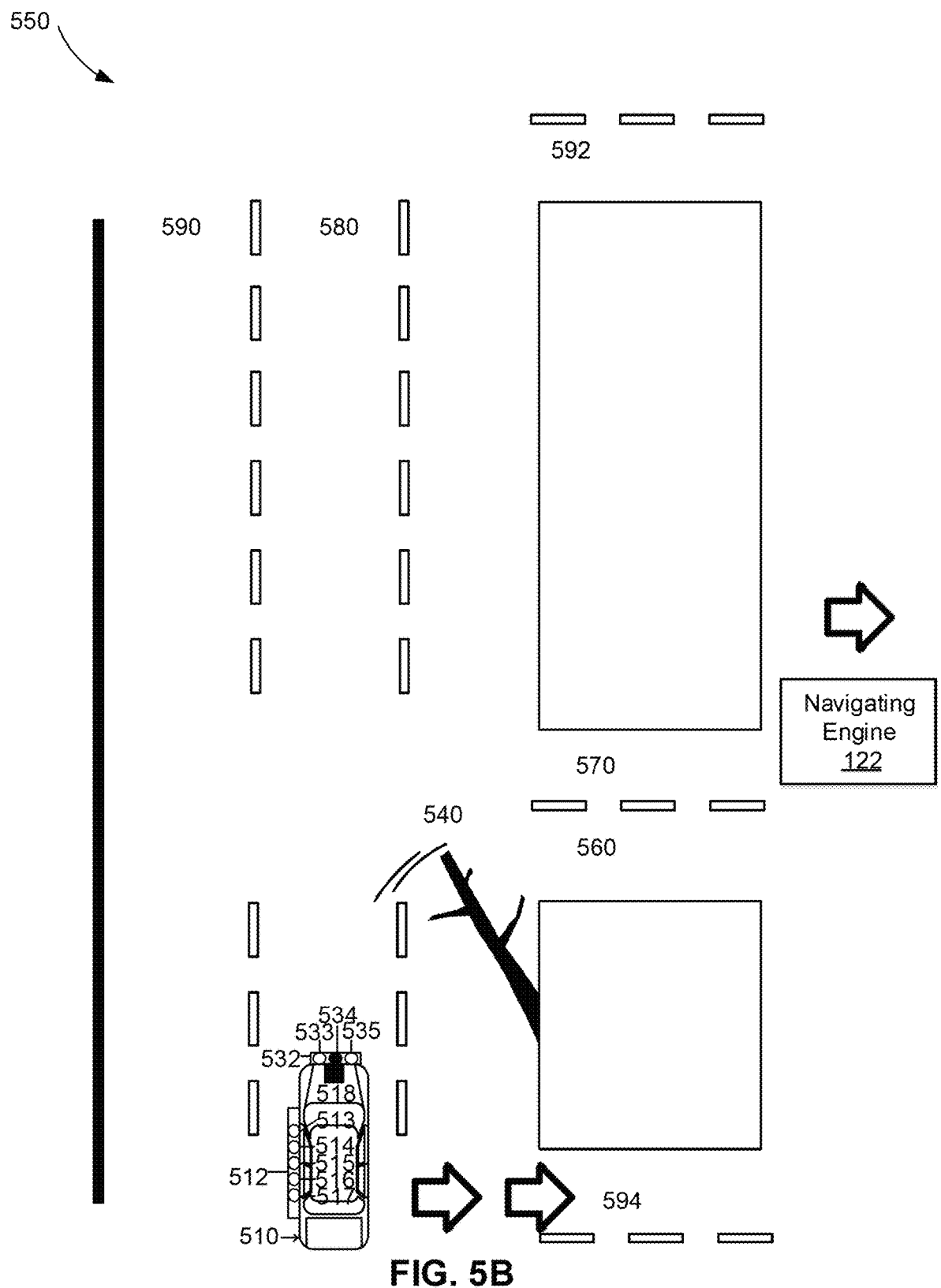
Figure 5B:
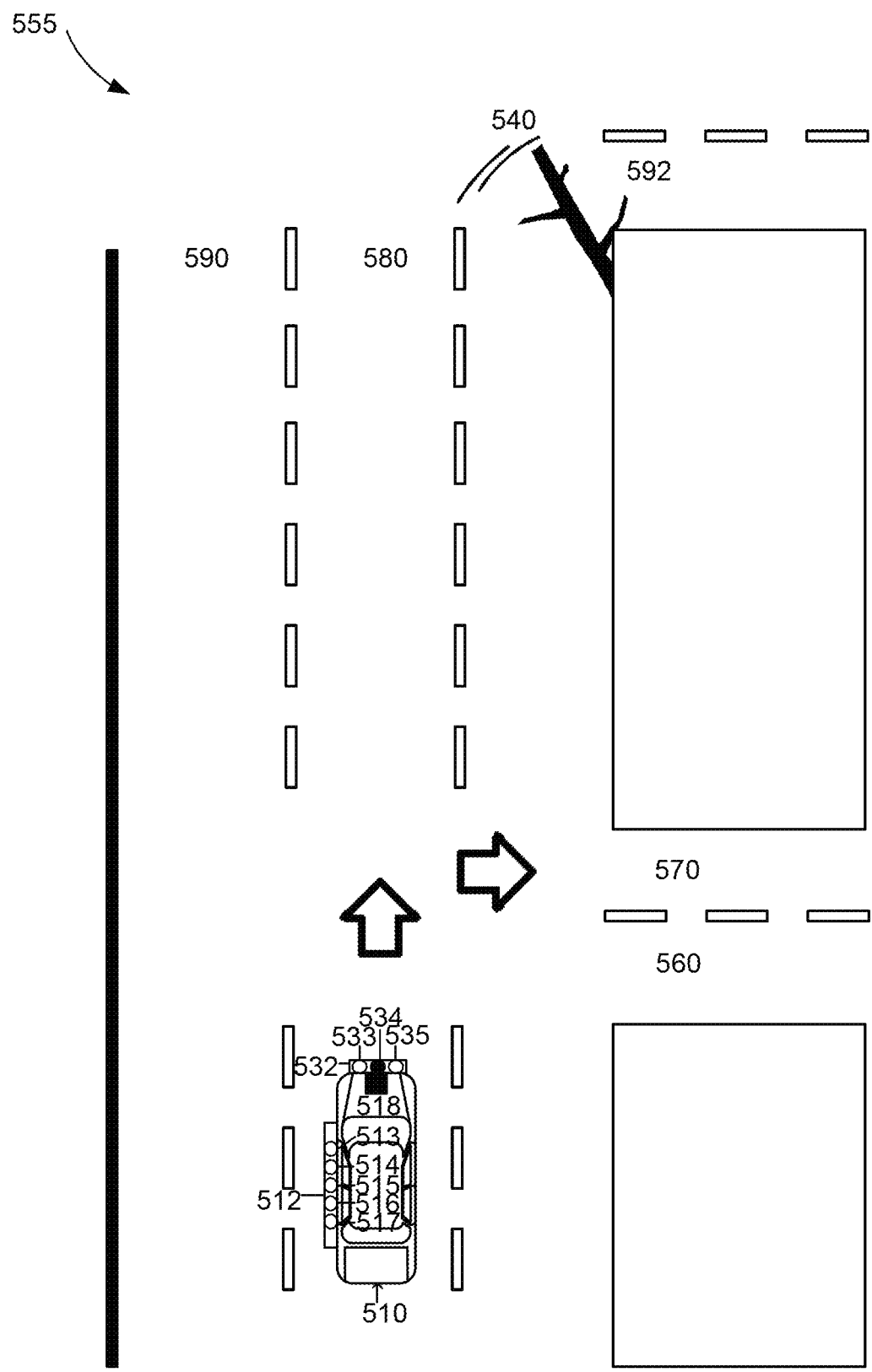

FIG. 5B illustrates an example implementation of a computing system, specifically, of a navigating engine such as the navigating engine 122, of the present disclosure. In the implementation 550 of FIG. 5B, the navigating engine 122 hypothetically would have, based on the implementation 500 that indicates the position of the obstacle 540 without accounting for distortions of the map 214, determined one or more navigation actions of the vehicle 510, in the event that the construction site is determined to be at such position. The vehicle 510, which may be implemented as the vehicle 101, may comprise an active Doppler sensor 518 and/or other sensors used to obtain data of an environment of the vehicle 510. The vehicle 510 may comprise an array 512 of lights, which may include lights 513, 514, 515, 516, and 517. In some embodiments, the array 512 may comprise any number of lights. Five lights are shown merely for illustrative purposes. For example, the vehicle 510, via the navigating engine 122, would have determined a detour into lane 594 in order to avoid the obstacle 540.

In implementation 555, the navigating engine 122 may determine one or more navigation actions of the vehicle 510 based on the adjusted position of the obstacle 540, in order to avoid the obstacle 540 or utilize a detour resulting from the obstacle 540. In some embodiments, the navigating engine 122 may determine that the vehicle 510 is to proceed along the lane 580 and turn into the lane 570. In some embodiments, the navigating engine 122 may not determine a navigation action in the implementation 550 and instead determine a navigation action in the implementation 555, because the implementation 550 does not show an accurate or adjusted position of the obstacle 540.

Figure 6:
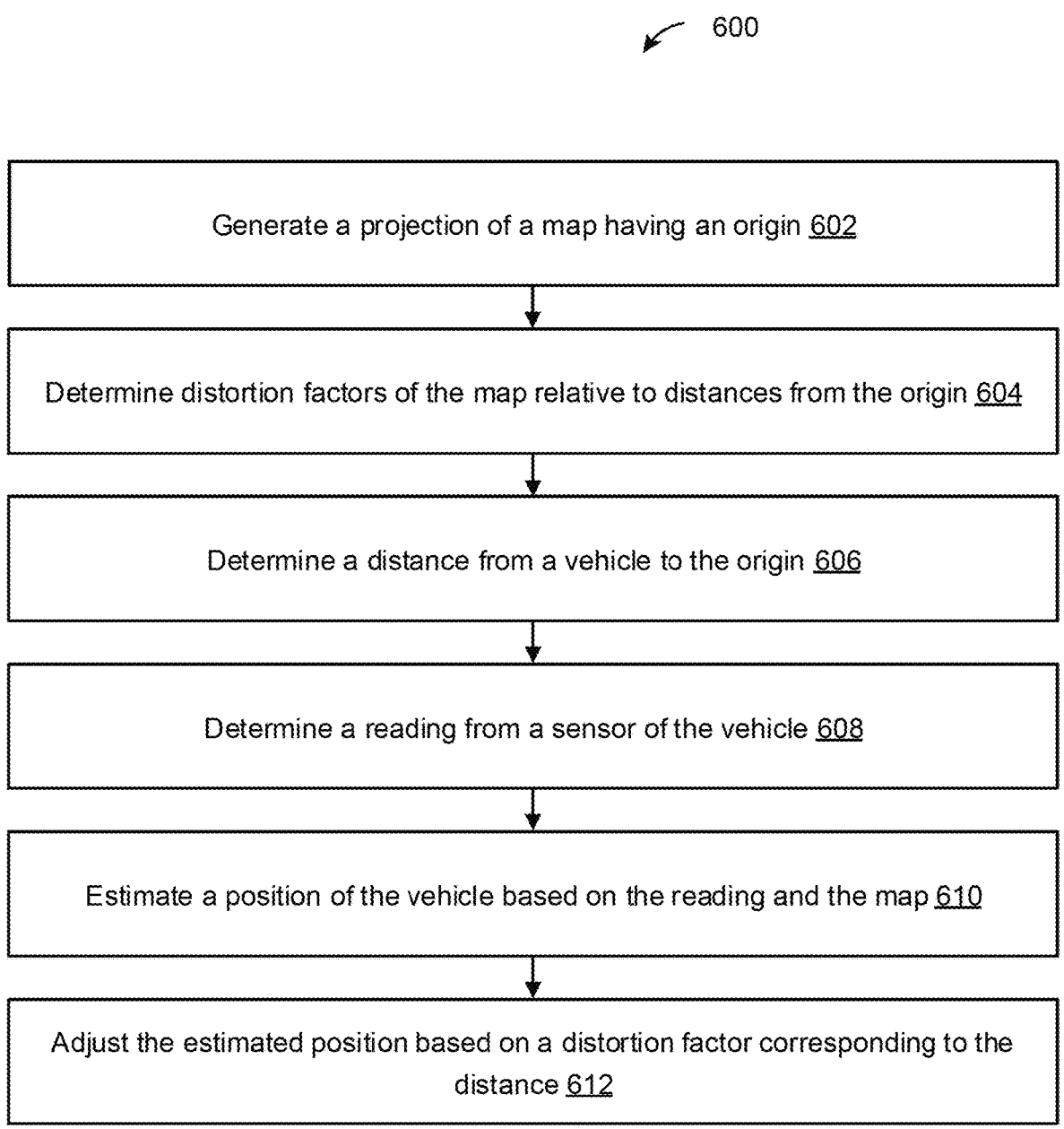
FIG. 6 illustrates a flowchart of an example of a method according to an embodiment of the present disclosure.

FIG. 6 illustrates a flowchart of a method according to some embodiments. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In step 602, a projection of a map having an origin may be generated. In step 602, distortion factors of the map may be determined relative to distances from the origin. In step

606, a distance from a vehicle to the origin may be determined. In step 608, a reading from a sensor to the vehicle may be determined. In step 610, a position of the vehicle may be estimated based on the reading and the map. In step 612, the estimated position may be adjusted based on a distortion factor corresponding to the distance. For example, if the vehicle is 100 km away, the estimated position may be adjusted based on a distortion factor corresponding to the distance of 100 km away from the origin.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
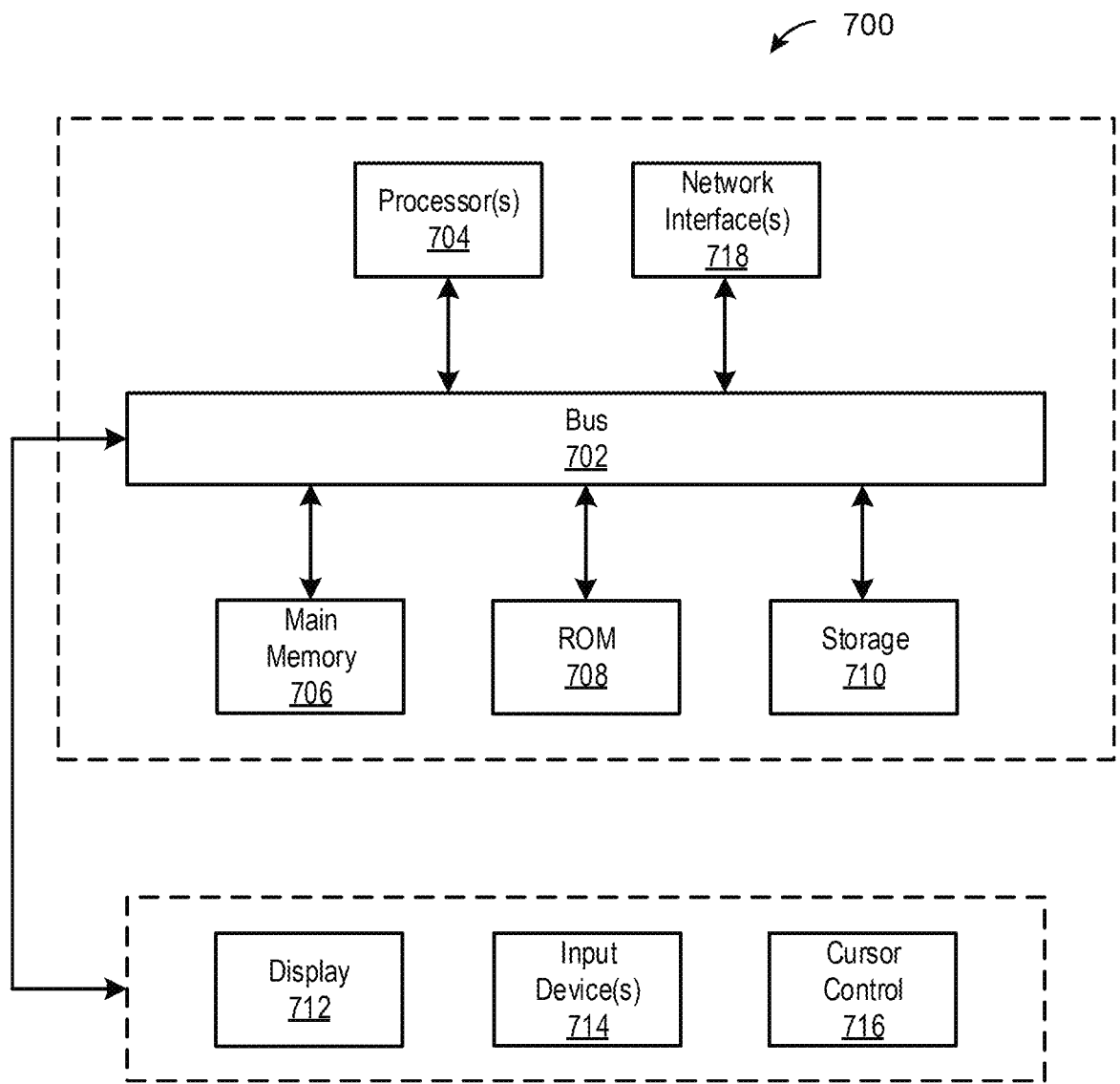
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   one or more processors; and
   a memory storing instructions that, when executed by the one or more processors, causes the system to perform:
   generating a projection of a map having an origin;
   determining distortion factors of the map relative to distances from the origin;
   determining a distance from a vehicle to the origin;
   determining a reading from a sensor of the vehicle; and
   adjusting the reading to coordinates of the map based on a distortion factor corresponding to the distance, wherein:
   the distortion factor indicates an amount of distortion based on a Universal Transverse Mercator (UTM) system,
   the adjusting of the reading comprises multiplying the reading by the distortion factor, and
   the distortion factor being a first parameter if the distance from the vehicle to the origin is within a first distance and being a second parameter if the distance from the vehicle to the origin is between the first distance and a second distance, wherein the second parameter is greater than the first parameter.

2. The system of claim 1, wherein the reading comprises a velocity or an acceleration.

3. The system of claim 1, wherein the adjusting the reading to the coordinates of the map based on the distortion factor comprises multiplying the reading by the distortion factor corresponding to the distance.

4. The system of claim 1, wherein the instructions further cause the system to perform:
   navigating the vehicle based on the adjusted reading.

5. The system of claim 1, wherein the instructions further cause the system to perform:
   adjusting a range over which the sensor operates based on the distortion factor corresponding to the distance.

6. The system of claim 1, wherein the distortion factors of the map increase as the distances from the origin increase.

7. The system of claim 1, wherein the generating the projection of the map having the origin comprises generating the map based on a Universal Transverse Mercator (UTM) coordinate system in a latitude direction and based on a World Geodetic System (WGS84) coordinate system in a longitude direction.

8. The system of claim 1, wherein the determining the distortion factors of the map relative to distances from the origin comprises determining the distortion factors based on respective amounts of distortion of a Universal Transverse Mercator (UTM) coordinate system at corresponding distances from the origin.

9. The system of claim 1, wherein the distortion factors indicate respective amounts of distortion of a Universal Transverse Mercator (UTM) coordinate system at corresponding distances from the origin.

10. The system of claim 1, wherein the sensor comprises any of an inertial measurement unit (IMU), a wheel encoder, a LiDar sensor, and a radar sensor.

11. The system of claim 1, wherein the adjusting of the reading comprises translating the reading to the coordinates of the map and correcting the translated reading based on the distortion error; and the instructions further cause the system to perform:
   determining a relative location of an obstacle based on the correcting of the translated reading and refraining from determining the relative location of the obstacle based on an uncorrected translated reading.

12. A method implemented by a computing system including one or more processors and storage media storing machine-readable instructions, wherein the method is performed using the one or more processors, the method comprising:
   generating a projection of a map having an origin;
   determining distortion factors of the map relative to distances from the origin;
   determining a distance from a vehicle to the origin;
   determining a reading from a sensor of the vehicle; and
   adjusting the reading to coordinates of the map based on a distortion factor corresponding to the distance, wherein:
   the distortion factor indicates an amount of distortion based on a Universal Transverse Mercator (UTM) system,
   the adjusting of the reading comprises multiplying the reading by the distortion factor, and
   the distortion factor being a first parameter if the distance from the vehicle to the origin is within a first distance and being a second parameter if the distance from the vehicle to the origin is between the first distance and a second distance, wherein the second parameter is greater than the first parameter.

13. The method of claim 12, wherein the reading comprises a velocity or an acceleration.

14. The method of claim 12, wherein the adjusting the reading to the coordinates of the map based on the distortion factor comprises multiplying the reading by the distortion factor corresponding to the distance.

15. The method of claim 12, further comprising:
   navigating the vehicle based on the adjusted reading.

16. The method of claim 12, further comprising:
   adjusting a range over which the sensor operates based on the distortion factor corresponding to the distance.

17. The method of claim 12, wherein the generating the projection of the map having the origin comprises generating the map based on a Universal Transverse Mercator (UTM) coordinate system in a latitude direction and based on a World Geodetic System (WGS84) coordinate system in a longitude direction.

18. The method of claim 12, wherein the determining the distortion factors of the map relative to distances from the origin comprises determining the distortion factors based on respective amounts of distortion of a Universal Transverse Mercator (UTM) coordinate system at corresponding distances from the origin.

19. The method of claim 12, wherein the distortion factors indicate respective amounts of distortion of a Universal Transverse Mercator (UTM) coordinate system at corresponding distances from the origin.

20. The method of claim 12, wherein the sensor comprises any of an inertial measurement unit (IMU), a wheel encoder, a LiDar sensor, and a radar sensor.

* * * * *